(12) United States Patent
Jin

(10) Patent No.: US 8,447,140 B1
(45) Date of Patent: *May 21, 2013

(54) METHOD AND APPARATUS FOR ESTIMATING ROTATION, FOCAL LENGTHS AND RADIAL DISTORTION IN PANORAMIC IMAGE STITCHING

(75) Inventor: Hailin Jin, Campbell, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,255

(22) Filed: Mar. 2, 2012

Related U.S. Application Data

(63) Continuation of application No. 12/035,954, filed on Feb. 22, 2008, now Pat. No. 8,131,113.

(60) Provisional application No. 60/991,108, filed on Nov. 29, 2007.

(51) Int. Cl.
*G06K 9/40* (2006.01)

(52) U.S. Cl.
USPC ........................................... 382/294; 345/651

(58) Field of Classification Search
USPC ................ 382/254, 255, 284, 289, 294, 296, 382/305, 312, 275; 348/36, 190; 345/629, 345/647, 649, 651
See application file for complete search history.

(56) References Cited

U.S. PATENT DOCUMENTS

| | | | |
|---|---|---|---|
| 6,044,181 A | 3/2000 | Szeliski et al. | |
| 6,075,905 A | 6/2000 | Herman et al. | |
| 6,097,854 A * | 8/2000 | Szeliski et al. | 382/284 |
| 6,157,747 A | 12/2000 | Szeliski et al. | |
| 6,587,601 B1 | 7/2003 | Hsu et al. | |
| 7,224,357 B2 * | 5/2007 | Chen et al. | 345/420 |
| 7,271,377 B2 * | 9/2007 | Mueller et al. | 250/208.1 |
| 7,391,930 B2 | 6/2008 | Shih et al. | |
| 7,428,345 B2 | 9/2008 | Caspi et al. | |
| 8,131,113 B1 | 3/2012 | Jin | |

OTHER PUBLICATIONS

A. Agarwala. Efficient gradient-domain compositing using quadtrees. In Proc. of ACM SIGGRAPH, 2007.
J. P. Barreto and K. Daniilidis. Fundamental matrix for cameras with radial distortion. In Proc. of Intl. Conf. on Computer Vision, 2005.
M. Brown, R. I. Hartley, and D. Nister. Minimal solutions for panoramic stitching. In Proc. of IEEE Conf. on Computer Vision and Pattern Recognition, 2007.
M. Brown and D. G. Lowe. Automatic panoramic image stitching using invariant features. Int. J. of Computer Vision, 74 (1):59-73, 2006.

(Continued)

*Primary Examiner* — Kanjibhai Patel
(74) *Attorney, Agent, or Firm* — Wolfe-SBMC

(57) ABSTRACT

Method and apparatus for estimating relative three-dimensional (3D) camera rotations, focal lengths, and radial (lens) distortions from point-correspondences in pairwise (two image) image alignment. A core estimator takes a minimal (three) number of point-correspondences and returns a rotation, lens (radial) distortion and two focal lengths. The core estimator solves relative 3D camera rotations, and lens distortions from 3-point-correspondences in two images in the presence of noise in point-correspondences. A robust estimator may be based on or may be "wrapped around" the core estimator to handle noise and errors in point-correspondences. The robust estimator may determine an alignment model for a pair of images from the rotation, distortion, and focal lengths.

20 Claims, 9 Drawing Sheets

OTHER PUBLICATIONS

M. Byröd, K. Josephson, and K. Åström. Improving numerical accuracy of gröbner basis polynomial equation solvers. In Proc. of Intl. Conf. on Computer Vision, 2007.

M A. Fischler and R. C. Bolles. Random sample consensus: a paradigm for model fitting with applications to image analysis and automated cartography. Communications of the ACM, 24(6):381-395, Jun. 1981.

A.W. Fitzgibbon. Simultaneous linear estimation of multiple view geometry and lens distortion. In Proc. of IEEE Conf. on Computer Vision and Pattern Recognition, 2001.

C. Geyer and H. Stewénius. A nine-point algorithm for estimating para-catadioptric fundamental matrices. In Proc. of IEEE Conf. on Computer Vision and Pattern Recognition, 2007.

Z. Zhang. A flexible new technique for camera calibration. IEEE Trans. on Pattern Analysis and Machine Intelligence, 22(11):1330-1334, Nov. 2000.

Z. Kukelova and T. Pajdla. A minimal solution to the autocalibration of radial distortion. In Proc. of IEEE Conf. on Computer Vision and Pattern Recognition, 2007.

Z. Kukelova and T. Pajdla. Two minimal problems for cameras with radial distortion. In Proc. of Seventh Workshop on Omnidirectional Vision, Camera Networks and Nonclassical Cameras, 2007.

H. Li and R. Hartley. A non-iterative method for correcting lens distortion from nine point correspondences. In Proc. of Workshop on Omnidirectional Vision, Camera Networks and Non-classical cameras, 2005.

H. Li and R. Hartley. Five-point motion estimation made easy. In Proc. of Intl. Con. on Pattern Recognition, vol. 1, pp. 630-633, 2006.

D. G. Lowe. Distinctive image features from scale-invariant keypoints. Int. J. of Computer Vision, 60(2):91-110, Nov. 2004.

B. Micusik and T. Pajdla. Estimation of omnidirectional camera model from epipolar geometry. In Proc. of IEEE Conf. on Computer Vision and Pattern Recognition, vol. 1, pp. 485-490, Jun. 2003.

D. Nister. An efficient solution to the five-point relative pose problem. IEEE Trans. on Pattern Analysis and Machine Intelligence, 26(6):756-777, Jun. 2004.

H. S. Sawhney and R. Kumar. True multi-image alignment and its application to mosaicing and lens distortion correction. IEEE Trans. on Pattern Analysis and Machine Intelligence, 21(3):235-243, Mar. 1999.

R. M. Steele and C. Jaynes. Overconstrained linear estimation of radial distortion and multi-view geometry. In Proc. of Europ. Conf. on Computer Vision, pp. 253-264, 2006.

H. Stewénius. Gröbner Basis Methods for Minimal Problems in Computer Vision. PhD thesis, Lund University, Apr. 2005.

H. Stewénius, F. Kahl, D. Nister, and F. Schaffalitzky. A minimal solution for relative pose with unknown focal length. In Proc. of IEEE Conf. on Computer Vision and Pattern Recognition, pp. 789-794, Jun. 2005.

H. Stewénius, F. Schaffalitzky, and D. Nister. How hard is 3-view triangulation really? in Proc. of Intl. Conf. on Computer Vision, 2005.

R. Szeliski. Image alignment and stitching: A tutorial. Foundations and Trends in Computer Graphics and Vision, 2(1), 2006.

B. Triggs, P. F. McLauchlan, R. I. Hartley, and A.W. Fitzgibbon. Bundle adjustment—a modern synthesis. In Proc. Intl. Workshop on Vision Algorithms: Theory and Practice, pp. 298-372, 1999.

R. Y. Tsai. Versatile camera calibration technique for high accuracy 3d machine vision metrology using off-the-shelf tv cameras and lenses. IEEE Trans. of Robotics and Automation, 3(4):323-344, Aug. 1987.

"Non-Final Office Action", U.S. Appl. No. 12/035,954, (Jul. 6, 2011), 10 pages.

"Notice of Allowance", U.S. Appl. No. 12/035,954, (Oct. 28, 2011), 7 pages.

* cited by examiner

METHOD AND APPARATUS FOR ESTIMATING ROTATION, FOCAL LENGTHS AND RADIAL DISTORTION IN PANORAMIC IMAGE STITCHING

PRIORITY INFORMATION

This application is a Continuation of U.S. application Ser. No. 12/035,954, filed Feb. 22, 2008 now U.S. Pat. No. 8,131,113, which claims benefit of priority of U.S. Provisional Application Ser. No. 60/991,108, filed Nov. 29, 2007, both entitled "Method and Apparatus for Estimating Rotation, Focal Lengths and Radial Distortion in Panoramic Image Stitching", the contents of which are incorporated by reference herein in their entirety.

BACKGROUND

1. Field of the Invention

This invention relates to computer systems, specifically to computer-aided image processing, and more specifically to the merging of images to form a composite image.

2. Description of the Related Art

Image capture devices, such as cameras, may be used to capture an image of a section of a view or scene, such as a section of the front of a house. The section of the view or scene whose image is captured by a camera is known as the field of view of the camera. Adjusting a lens associated with a camera may increase the field of view. However, there is a limit beyond which the field of view of the camera cannot be increased without compromising the quality, or "resolution", of the captured image. Further, some scenes or views may be too large to capture as one image with a given camera at any setting. Thus, it is sometimes necessary to capture an image of a view that is larger than can be captured within the field of view of a camera. In these instances, multiple overlapping images of segments of the view or scene may be taken, and then these component images may be joined together, or merged, to form a composite image.

One type of composite image is known as a panoramic image. A panoramic image may have a rightmost and leftmost image that each overlap only one other image, or alternatively the images may complete 360°, where all images overlap at least two other images. In the simplest type of panoramic image, there is one row of images, with each image at most overlapping two other images. However, more complex composite images may be captured that have two or more rows of images; in these composite images, each image may potentially overlap more than two other images. For example, a motorized camera may be configured to scan a scene according to an M×N grid, capturing an image at each position in the grid. Other geometries of composite images may be captured.

Computer programs and algorithms exist for assembling a single composite image from multiple potentially overlapping component images. A general paradigm for automatic image stitching techniques is to first detect features in individual images; second, to establish feature correspondences and geometric relationships between pairs of images (pairwise stage); and third, to use the feature correspondences and geometric relationships between pairs of images found at the pairwise stage to infer the geometric relationship among all the images (multi-image stage).

Image stitching is thus a technique to combine and create images with large field of views. Feature-based stitching techniques are image stitching techniques that use point-correspondences, instead of image pixels directly, to estimate the geometric transformations between images. An alternative is intensity-based stitching techniques that use image pixels to infer the geometric transformations. Many image stitching implementations make assumptions that images are related either by 2D projective transformations or 3D rotations. However, there are other types of deformations in images that are not captured by the aforementioned two, for instance, lens distortions.

Panoramic image alignment is the problem of computing geometric relationships among a set of component images for the purpose of stitching the component images into a composite image. Feature-based techniques have been shown to be capable of handling large scene motions without initialization. Most feature-based methods are typically done in two stages: pairwise alignment and multi-image alignment. The pairwise stage starts from feature (point) correspondences, which are obtained through a separate feature extraction and feature matching process or stage, and returns an estimate of the alignment parameters and a set of point-correspondences that are consistent with the parameters. Various robust estimators or hypothesis testing frameworks may be used to handle outliers in point-correspondences.

The multi-image stage may use various techniques to further refine the alignment parameters, jointly over all the images, based on the consistent point-correspondences retained in the pairwise stage. It is known that the convergence of the multi-image stage depends on how good the initial guesses are. However, an equally important fact that is often overlooked is that the quality of the final result from the multi-image stage depends on the number of consistent point-correspondences retained in the pairwise stage. When the number of consistent point-correspondences is low, the multi-image alignment will still succeed, but the quality of the final result may be poor.

In the pairwise stage, it is commonly assumed that an imaging system satisfies an ideal pinhole model. As a result, many conventional methods only estimate either 3×3 homographies or "rotation+focal lengths". However, real imaging systems have some amount of lens distortion. Moreover, wide-angle lenses that are commonly used for shooting panoramic images may introduce larger distortions than regular lenses. Modeling lens distortion is critical for obtaining high-quality alignment. It may appear that it is sufficient to model lens distortion at the multi-image alignment stage. This strategy may work if all the most correct correspondences are kept at the pairwise alignment. However, without modeling lens distortion at the pairwise stage, it may not be possible to retain all of the most correct correspondences. Among those most correct correspondences that may be rejected by the model without lens distortion, many may be ones close to image borders, because lens distortion effects are more pronounced for the points close to image borders than those close to image centers. Correspondences that have points close to image borders are, on the other hand, more important for estimating lens distortion, for the same reason that lens distortion effects are larger there. Losing them at the pairwise stage makes it difficult for the multi-image stage to correctly estimate lens distortion. As a result, misalignment may show up when images are stitched together, particularly along the image borders. Therefore, it is important to estimate the lens distortion jointly with other alignment parameters at the pairwise stage.

RANSAC

RANSAC is an exemplary robust estimator or hypothesis testing framework. RANSAC is an abbreviation for "RANdom SAmple Consensus". RANSAC provides a hypothesis testing framework that may be used, for example, to estimate parameters of a mathematical model from a set of observed data which contains outliers.

EXIF

EXIF stands for Exchangeable Image File Format, and is a standard for storing interchange information in image files, especially those using Joint Photographic Experts Group (JPEG) compression. Most digital cameras now use the EXIF format. The format is part of the Design rule for Camera File system (DCF) standard created by Japan Electronics and Information Technology Industries Association (JEITA) to encourage interoperability between imaging devices.

SUMMARY

Various embodiments of a method and apparatus for estimating relative three-dimensional (3D) camera rotations, focal lengths, and radial (lens) distortions from point-correspondences in pairwise (two image) image alignment are described. Embodiments may provide a core estimator that takes a minimal (three) number of point-correspondences and returns a rotation, lens (radial) distortion and two focal lengths. In embodiments, a robust estimator may be based on or may be "wrapped around" the core estimator to handle noise and errors in the point-correspondences. Embodiments may be implemented in composite image generation systems used to generate composite images from sets of input component images.

Embodiments may provide a three-point minimal solution for panoramic stitching with lens distortion. Embodiments may be directed at panoramic image alignment, which is the problem of computing geometric relationships among images for the purpose of stitching the images into composites. In particular, embodiments may be directed at feature-based techniques. Embodiments may provide a minimal solution (a core estimator) for aligning two images taken by a rotating camera from point-correspondences. Embodiments in particular address the case where there is lens distortion in the images. The two camera centers may be assumed to be known, but not the focal lengths, and the focal lengths may be allowed to vary. Embodiments may provide a core estimator that uses a minimal number (three) of point-correspondences, and that is well suited for use in a hypothesis testing framework (i.e., a robust estimator). The three-point minimal solution provided by embodiments of the core estimator does not suffer from numerical instabilities observed in conventional algebraic minimal solvers.

Embodiments of a core estimator may estimate rotation, focal lengths, and radial distortion using three point correspondence, which is minimal, and do so at the pairwise stage of a composite image generation process. Thus, embodiments of the core estimator may provide a three-point minimal solution. Some embodiments of the core estimator may work with more than three point-correspondences. An embodiment of the core estimator is described that is not based on Algebraic Geometry but is instead based on nonlinear optimization, and thus does not suffer from numerical instabilities observed in many conventional minimal solvers. In addition, embodiments of the core estimator address lens distortion in the panoramic image alignment problem.

In one embodiment, for each pair of overlapping images in a set of component images, a plurality of point-correspondences may be generated, for example by a feature extraction and feature matching stage of a composite image generation process. Feature extraction extracts features from the pair of images, and feature matching generates the actual point-correspondences from the extracted features. For each pair of overlapping images in the set of component images, relative rotation, focal lengths, and radial distortion for the pair of images may be estimated by the core estimator from sets of three point-correspondences for the two images. In one embodiment, a robust estimator or hypothesis testing framework may select sets of three point-correspondences and feed the sets to the core estimator. For each set of three point-correspondences for the pair of overlapping images, an alignment model for the pair of images may be generated by the robust estimator from the corresponding relative rotation, focal lengths, and radial distortion as estimated and output by the core estimator. An alignment model is a mathematical model that defines the geometric relationship between two images and that may be applied to the image data to adjust one or both images into alignment as part of the process of merging component images into a composite or panoramic image. In embodiments, an alignment model is a combination of relative rotation, focal lengths, and radial distortion.

An embodiment may use the robust estimator to generate sets of alignment models for each pair of overlapping images, with the robust estimator using the core estimator to estimate relative rotation, focal lengths, and radial distortion (an alignment model) for each set of three point-correspondences input to the core estimator. The robust estimator may determine a best alignment model (best combination of relative rotation, focal lengths, and radial distortion) for each pair of overlapping images from the generated alignment models for the overlapping pairs of images and output the determined best alignment models for all pairs of overlapping images to a multi-image processing stage of the composite image generation process. A composite image may then be generated from the set of component images in accordance with the determined best alignment models for the set of component images.

Figure 1:
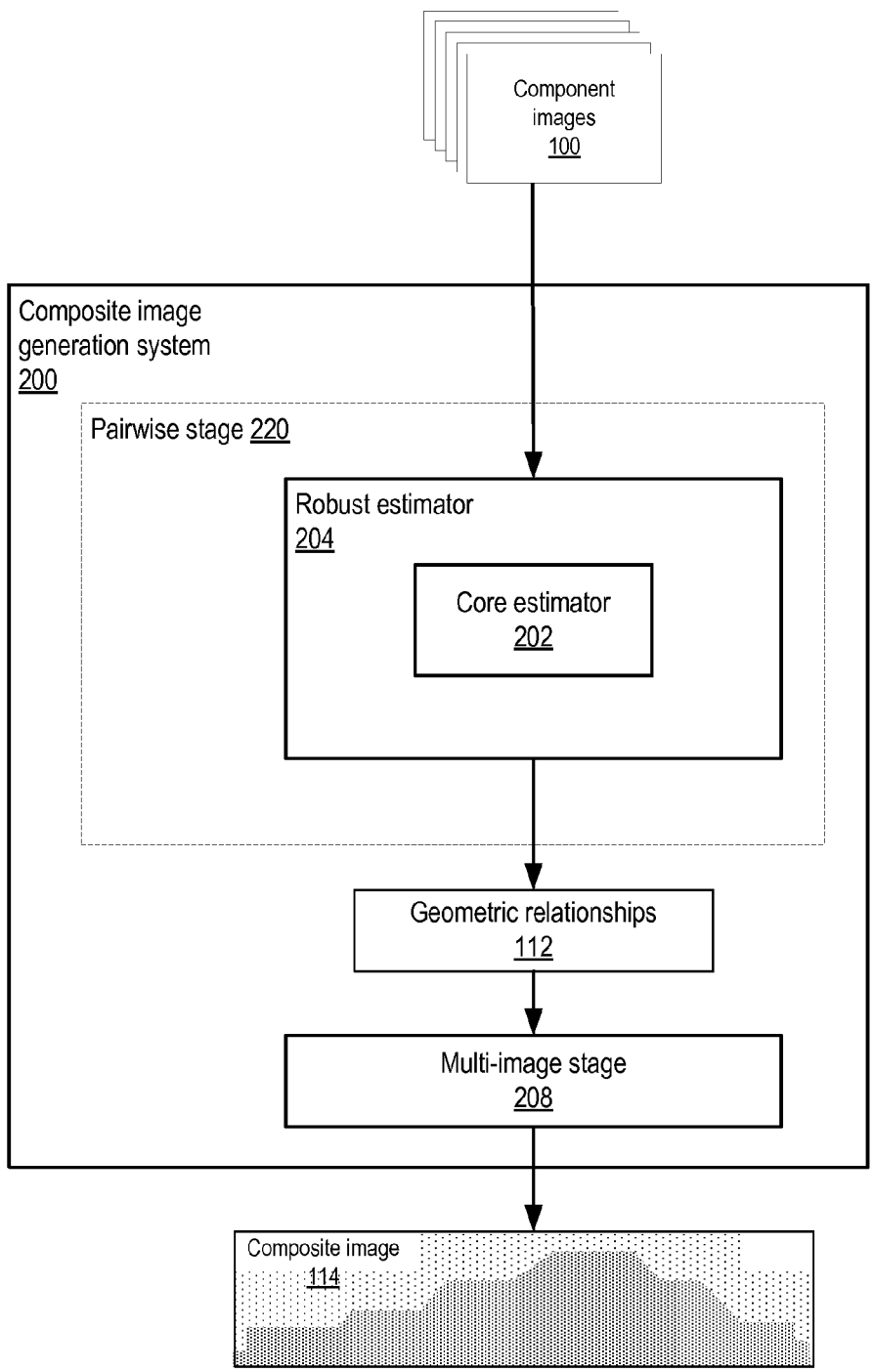
FIG. 1 illustrates an exemplary composite image generation system that includes an exemplary core estimator according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for estimating relative three-dimensional (3D) camera rotations, focal lengths, and radial (lens) distortions from point-correspondences in pairwise (two image) image alignment are described. Embodiments may provide a core estimator that takes a minimal (three) number of point-correspondences and returns a rotation, lens (radial) distortion and two focal lengths (one for each image). Embodiments may include a robust estimator or hypothesis testing framework may be based on or may be "wrapped around" the core estimator to handle noise and errors in point-correspondences. Embodiments may be implemented in composite image generation systems used to generate composite images from sets of input component images.

Using three points may significantly reduce the number of trials needed by a robust estimator such as the RANSAC (RANdom SAmple Consensus) algorithm. Embodiments may estimate camera rotations, focal lengths and lens distortion directly and therefore may avoid problems that may occur in two-step or other conventional approaches. Embodiments may handle errors in point-correspondences. Results of the core estimator and robust estimator may be fed into any of various algorithms for multi-image stitching. While RANSAC is used herein as an example of a robust estimator or hypothesis testing framework that may be used in embodiments, other robust estimators or hypothesis testing frameworks may be used.

Embodiments provide a core estimator that includes correction for lens distortion and that may use a minimum number (three) of point-correspondences. Embodiments may provide a core estimator for simultaneous estimation of a single radial distortion coefficient, a rotation and two focal lengths. Embodiments of the core estimator may use only three point-correspondences and are suited for use in hypothesis testing frameworks such as RANSAC. Although it is possible to use a Gröbner basis or a computer program or application, such as HOMPACK, that solves numerical equations to solve the resulting polynomial equations, and embodiments are described that do so, embodiments that solve the problem using a nonlinear optimization core estimator are also described. Advantages of using nonlinear optimization to solve the resulting polynomial equations include being able to make use of prior knowledge and being free from numerical instability issues. The cost optimized by embodiments is a geometric one instead of an algebraic one. Although embodiments of the core estimator may be more expensive than some other solvers such as a conventional three-point algorithm, embodiments of the core estimator may be much faster when the entire pairwise image processing state including the operations of a hypothesis testing framework (e.g., RANSAC) process is considered for images with lens distortion because embodiments of the core estimator may be able to find more of the best or most correct point-correspondences for a pair of images in fewer trials.

Three-Point Minimal Solution for Panoramic Stitching with Lens Distortion

Embodiments may provide a three-point minimal solution for panoramic stitching with lens distortion. Embodiments may be directed at panoramic image alignment, which is the problem of computing geometric relationships among images for the purpose of stitching them into composites. In particular, embodiments may be directed at feature-based techniques. Embodiments may provide a minimal solution (a core estimator) for aligning two images taken by a rotating camera from point-correspondences. Embodiments in particular may address the case where there is lens distortion in the images. The two camera centers may be assumed to be known, but not the focal lengths, and the focal lengths may be allowed to vary. Embodiments may provide a core estimator that uses a minimal number (three) of point-correspondences, and that is well suited for use in a hypothesis testing framework (i.e., a robust estimator). The three-point minimal solution provided by embodiments of the core estimator may not suffer from numerical instabilities observed in conventional algebraic minimal solvers and also may be more efficient when compared to conventional methods. The three-point minimal solution provided by embodiments of the core estimator may be applied in multi-image panoramic stitching on real images with lens distortion, as illustrated in several examples presented in FIGS. 7A through 7C, FIGS. 8A and 8B, and FIGS. 9A through 9C, which are further described below.

Embodiments of a core estimator as described herein may estimate rotation, focal lengths, and radial distortion using three point-correspondence, which is minimal, and do so at the pairwise stage. Thus, embodiments of the core estimator may provide a three-point minimal solution. Some embodiments of the core estimator may work with more than three point-correspondences.

Some embodiments may use the division model for radial distortion, or variations thereof, for panoramic image alignment, although other models or algorithms may be used in embodiments. An embodiment of the core estimator is presented that is not based on Algebraic Geometry but is instead based on nonlinear optimization, and thus does not suffer from numerical instabilities observed in many conventional minimal solvers. In addition, embodiments of the core estimator address lens distortion in the panoramic image alignment problem.

The Core Two-View Problem

In this section, a core problem in the pairwise alignment stage—how to relate lens distortion to point-correspondences along with other geometric parameters—is addressed. Two cameras are considered with coincident optical centers viewing three points $P_1$, $P_2$ and $P_3$. Let $X_1 \in R^3$ be the coordinates of $P_1$ with respect to the reference frame of the first camera. The imaging process is modeled as an ideal pinhole projection plus radial distortion. In particular, the pinhole model says that the projection of $P_1$ on the imaging plane of the first camera, $q_1 \in R^2$, is related to $X_1$ by a perspective projection:

$$q_1 = \pi(X_1) = \left[ \frac{X_{11}}{X_{13}}, \frac{X_{12}}{X_{13}} \right]^T \qquad (1)$$

where $X_1=[X_{11},X_{12},X_{13}]^T$. The radial distortion may be modeled, for example, with the division model:

$$q_1 = \frac{p_1}{1+\kappa_1\|p_1\|^2} \quad (2)$$

where $p_1 \in R^2$ is the radially distorted point and $\kappa_1 \in R$ is the radial distortion coefficient. Note, however, that other distortion models may be used in embodiments. The measurement $X_1 \in R2$, in image coordinates, is related to $p_1$ through a linear transformation $K_1$ (intrinsic calibration):

$$x_1 = K_1 \circ p_1 \doteq \begin{bmatrix} f_1 & \sigma_1 \\ 0 & s_1 f_1 \end{bmatrix} p_1 + c_1 \quad (3)$$

where $f_1$ is the focal length, $c_1$ is the camera center, $s_1$ is the aspect ratio, and $\sigma_1$ is the skew of the pixel. $K_1$ is invertible and its inverse $K_1^{-1}$ is given by:

$$p_1 = K_1^{-1} \circ x_1 \doteq \begin{bmatrix} f_1 & \sigma_1 \\ 0 & s_1 f_1 \end{bmatrix}^{-1} (x_1 - c_1) \quad (4)$$

Combining equations (1), (2), and (3), the following is obtained:

$$X_1 \sim \begin{bmatrix} K_1^{-1} \circ x_1 \\ 1+\kappa_1\|K_1^{-1} \circ x_1\|^2 \end{bmatrix} \quad (5)$$

where ~ indicates similarity relationship, i.e. the quantities are equal up to a scale. Let $X_2$ be the coordinates of $P_1$ with respect to the reference frame of the second camera and $x_2$ be the radially distorted projection. The following is obtained:

$$X_2 \sim \begin{bmatrix} K_2^{-1} \circ x_2 \\ 1+\kappa_2\|K_2^{-1} \circ x_2\|^2 \end{bmatrix} \quad (6)$$

where $\kappa_2$ and $K_2$ are the radial distortion coefficient and the intrinsic calibration of the second camera respectively. The two cameras are related by a rotation, $R \in SO(3)$; therefore, $X_1 = RX_2$.

Considering a second point $P_2$ which has coordinates $Y_1$ and $Y_2$ with respect to the two reference frames, a key idea for eliminating the rotation is to notice that rotations preserve angles between vectors:

$$\theta_{X_1,Y_1} = \theta_{X_2,Y_2} \quad (7)$$

where $\theta_{X_1 Y_1}$ measures the angle between $X_1$ and $Y_1$. Using equations (5) and (6), angles can be expressed using distorted projections as:

$$\theta_{X_1 Y_1} = \frac{\langle X_1, Y_1 \rangle}{\|X_1\| \cdot \|Y_1\|} = \frac{\left\langle \begin{bmatrix} K_1^{-1} \circ x_1 \\ 1+\kappa_1\|K_1^{-1} \circ x_1\|^2 \end{bmatrix}, \begin{bmatrix} K_1^{-1} \circ y_1 \\ 1+\kappa_1\|K_1^{-1} \circ y_1\|^2 \end{bmatrix} \right\rangle}{\left\| \begin{bmatrix} K_1^{-1} \circ x_1 \\ 1+\kappa_1\|K_1^{-1} \circ x_1\|^2 \end{bmatrix} \right\| \cdot \left\| \begin{bmatrix} K_1^{-1} \circ y_1 \\ 1+\kappa_1\|K_1^{-1} \circ y_1\|^2 \end{bmatrix} \right\|} \quad (8)$$

-continued $$\theta_{X_2 Y_2} = \frac{\langle X_2, Y_2 \rangle}{\|X_2\| \cdot \|Y_2\|} = \frac{\left\langle \begin{bmatrix} K_2^{-1} \circ x_2 \\ 1+\kappa_2\|K_2^{-1} \circ x_2\|^2 \end{bmatrix}, \begin{bmatrix} K_2^{-1} \circ y_2 \\ 1+\kappa_2\|K_2^{-1} \circ y_2\|^2 \end{bmatrix} \right\rangle}{\left\| \begin{bmatrix} K_2^{-1} \circ x_2 \\ 1+\kappa_2\|K_2^{-1} \circ x_2\|^2 \end{bmatrix} \right\| \cdot \left\| \begin{bmatrix} K_2^{-1} \circ y_2 \\ 1+\kappa_2\|K_2^{-1} \circ y_2\|^2 \end{bmatrix} \right\|}$$

where $y_1, y_2 \in R_2$ are the radially distorted projections of $P_2$ in the two respective cameras.

To further simplify the problem, the following assumptions may be made:

- the two camera centers are known and coincide with the respective image centers;
- there is no pixel skew and the pixel aspect ratio is 1, i.e. pixels are square; and
- the focal lengths for the two cameras may vary but the radial distortion coefficients are the same.

While the assumption of known camera centers and square pixels are typical for image stitching algorithms, it may appear that the assumption of varying focal lengths contradicts that of constant distortion coefficients. Indeed, it is true that the distortion coefficient changes when a lens zooms. However, when a lens does not zoom or the zoom amount is small, the distortion coefficient approximately stays constant, which is the most common scenario for panoramic stitching: people do not typically zoom when they shoot panoramas. Note that it should not be assumed that the focal lengths stay the same because they may vary when the camera focuses on objects with different depths even under the same zoom. Under these assumptions, $K_i^{-1} \circ x_i$ reduces to $$\frac{1}{f_i}\bar{x}_i$$

where $\bar{x}_i \doteq x_i - c_i$. Equation (8) may be rewritten as:

$$\frac{\frac{1}{f_1^2}\langle \bar{x}_1, \bar{y}_1 \rangle + \left(1+\frac{\kappa}{f_1^2}\|\bar{x}_1\|^2\right)\left(1+\frac{\kappa}{f_1^2}\|\bar{y}_1\|^2\right)}{\sqrt{\frac{1}{f_1^2}\|\bar{x}_1\|^2 + \left(1+\frac{\kappa}{f_1^2}\|\bar{x}_1\|^2\right)} * \sqrt{\frac{1}{f_1^2}\|\bar{y}_1\|^2 + \left(1+\frac{\kappa}{f_1^2}\|\bar{y}_1\|^2\right)}} = \quad (9)$$

$$\frac{\frac{1}{f_2^2}\langle \bar{x}_2, \bar{y}_2 \rangle + \left(1+\frac{\kappa}{f_2^2}\|\bar{x}_2\|^2\right)\left(1+\frac{\kappa}{f_2^2}\|\bar{y}_2\|^2\right)}{\sqrt{\frac{1}{f_2^2}\|\bar{x}_2\|^2 + \left(1+\frac{\kappa}{f_2^2}\|\bar{x}_2\|^2\right)} * \sqrt{\frac{1}{f_2^2}\|\bar{y}_2\|^2 + \left(1+\frac{\kappa}{f_2^2}\|\bar{y}_2\|^2\right)}}$$

where $\kappa = \kappa_1 = \kappa_2$. An additional point $P_3$ yields two more equations:

$$\frac{\frac{1}{f_1^2}\langle \bar{y}_1, \bar{z}_1 \rangle + \left(1+\frac{\kappa}{f_1^2}\|\bar{y}_1\|^2\right)\left(1+\frac{\kappa}{f_1^2}\|\bar{z}_1\|^2\right)}{\sqrt{\frac{1}{f_1^2}\|\bar{y}_1\|^2 + \left(1+\frac{\kappa}{f_1^2}\|\bar{y}_1\|^2\right)} * \sqrt{\frac{1}{f_1^2}\|\bar{z}_1\|^2 + \left(1+\frac{\kappa}{f_1^2}\|\bar{z}_1\|^2\right)}} = \quad (10)$$

$$\frac{\frac{1}{f_2^2}\langle \bar{y}_2, \bar{z}_2 \rangle + \left(1+\frac{\kappa}{f_2^2}\|\bar{y}_2\|^2\right)\left(1+\frac{\kappa}{f_2^2}\|\bar{z}_2\|^2\right)}{\sqrt{\frac{1}{f_2^2}\|\bar{y}_2\|^2 + \left(1+\frac{\kappa}{f_2^2}\|\bar{y}_2\|^2\right)} * \sqrt{\frac{1}{f_2^2}\|\bar{z}_2\|^2 + \left(1+\frac{\kappa}{f_2^2}\|\bar{z}_2\|^2\right)}}$$

-continued $$\frac{\frac{1}{f_1^2}\langle \bar{z}_1, \bar{x}_1\rangle +\left(1+\frac{\kappa}{f_1^2}\|\bar{z}_1\|^2\right)\left(1+\frac{\kappa}{f_1^2}\|\bar{x}_1\|^2\right)}{\sqrt{\frac{1}{f_1^2}\|\bar{z}_1\|^2+\left(1+\frac{\kappa}{f_1^2}\|\bar{z}_1\|^2\right)^2}*\sqrt{\frac{1}{f_1^2}\|\bar{x}_1\|^2+\left(1+\frac{\kappa}{f_1^2}\|\bar{x}_1\|^2\right)^2}}=$$

$$\frac{\frac{1}{f_2^2}\langle \bar{z}_2, \bar{x}_2\rangle +\left(1+\frac{\kappa}{f_2^2}\|\bar{z}_2\|^2\right)\left(1+\frac{\kappa}{f_2^2}\|\bar{x}_2\|^2\right)}{\sqrt{\frac{1}{f_2^2}\|\bar{z}_2\|^2+\left(1+\frac{\kappa}{f_2^2}\|\bar{z}_2\|^2\right)^2}*\sqrt{\frac{1}{f_2^2}\|\bar{x}_2\|^2+\left(1+\frac{\kappa}{f_2^2}\|\bar{x}_2\|^2\right)^2}}$$

(11)

where $\bar{z}_1, \bar{z}_2 \in R^2$ are the radially distorted projections of $P_3$. There are three unknowns ($f_1$, $f_2$ and $\kappa$) in equations (9-11). These three equations are generally independent and sufficient to determine the unknowns. On the other hand, it would not be possible to derive three equations from less than three point-correspondences. Therefore, three is the minimal number of point-correspondences.

Core Estimators

Several methods for solving equations (9-11) are described that may be used in various embodiments of a core estimator. Some embodiments of a core estimator may be based on a computer program or application that solves numerical equations, such as HOMPACK, which uses homotopy methods. An embodiment of a core estimator based on HOMPACK is described. In addition, a core estimator based on a Gröbner basis is described. An embodiment of a core estimator based on nonlinear optimization is also described.

Equations (9-11) may be rewritten into a set of polynomials equations by squaring both sides and re-arranging the terms. The results yield equations (12):

$$(\langle \bar{x}_1, \bar{y}_1\rangle +F_1(1+\lambda_1\|\bar{x}_1\|^2)(1+\lambda_1\|\bar{y}_1\|^2))^2(\|\bar{x}_2\|^2+F_2(1+\lambda_2\|\bar{x}_2\|^2)^2)(\|\bar{y}_2\|^2+F_2(1+\lambda_2\|\bar{y}_2\|^2)^2)=(\langle \bar{x}_2,\bar{y}_2\rangle +F_2(1+\lambda_2\|\bar{x}_2\|^2)(1+\lambda_2\|\bar{y}_2\|^2))^2(\|\bar{x}_1\|^2+F_1(1+\lambda_1\|\bar{x}_1\|^2)^2)(\|\bar{y}_1\|^2+F_1(1+\lambda_1\|\bar{y}_1\|^2)^2)$$

$$(\langle \bar{y}_1, \bar{z}_1\rangle +F_1(1+\lambda_1\|\bar{y}_1\|^2)(1+\lambda_1\|\bar{z}_1\|^2))^2(\|\bar{y}_2\|^2+F_2(1+\lambda_2\|\bar{y}_2\|^2)^2)(\|\bar{z}_2\|^2+F_2(1+\lambda_2\|\bar{z}_2\|^2)^2)=(\langle \bar{y}_2,\bar{z}_2\rangle +F_2(1+\lambda_2\|\bar{y}_2\|^2)(1+\lambda_2\|\bar{z}_2\|^2))^2(\|\bar{y}_1\|^2+F_1(1+\lambda_1\|\bar{y}_1\|^2)^2)(\|\bar{z}_1\|^2+F_1(1+\lambda_1\|\bar{z}_1\|^2)^2)$$

$$(\langle \bar{z}_1, \bar{x}_1\rangle +F_1(1+\lambda_1\|\bar{z}_1\|^2)(1+\lambda_1\|\bar{x}_1\|^2))^2(\|\bar{z}_2\|^2+F_2(1+\lambda_2\|\bar{z}_2\|^2)^2)(\|\bar{x}_2\|^2+F_2(1+\lambda_2\|\bar{x}_2\|^2)^2)=(\langle \bar{z}_2,\bar{x}_2\rangle +F_2(1+\lambda_2\|\bar{z}_2\|^2)(1+\lambda_2\|\bar{x}_2\|^2))^2(\|\bar{z}_1\|^2+F_1(1+\lambda_1\|\bar{z}_1\|^2)^2)(\|\bar{x}_1\|^2+F_1(1+\lambda_1\|\bar{x}_1\|^2)^2)$$

where $F_i := f_i^2$ and $\lambda_i := \kappa/f_i^2$, $i=1,2$. $F_i$ and $\lambda_i$ are related by:

$$\lambda_1 F_1 = \lambda_2 F_2 \quad (13)$$

It can be verified that equations (12) and (13) are indeed sufficient to determine all four unknowns, $F_1$, $F_2$, $\lambda_1$ and $\lambda_2$. It is possible to further constrain the problem by noticing the following relationship:

$$\frac{[X_1, Y_1, Z_1]}{\|X_1\| \cdot \|Y_1\| \cdot \|Z_1\|} = \frac{[X_2, Y_2, Z_2]}{\|X_2\| \cdot \|Y_2\| \cdot \|Z_2\|} \quad (14)$$

where [X,Y,Z] denotes the scalar triple product: $\langle X, Y \times Z\rangle$, for any vectors $X,Y,Z \in R^3$. This triple product based constraint is not algebraically independent but can be used to remove extraneous solutions nevertheless. To be more precise, there are 96 solutions, both real and complex, to equations (12) and (13), out of which 54 satisfy (14).

Equations (12) may be solved jointly. From the solution, the following may be computed:

$$f_1 = \sqrt{F_1}$$

$$f_2 = \sqrt{F_2}$$

Numerical Solution-Based Core Estimators

The equations (12) may be solved numerically, for example using a computer program or application that solves numerical equations. An example of such a program that may be used is HOMPACK. HOMPACK is a suite of subroutines for solving nonlinear systems of equations using homotopy methods. Other methods for solving the equations may be used. However, a numerical solution such as a solution that uses HOMPACK to solve the equations may tend to suffer from numerical instability.

Gröbner Basis Core Estimator

It is possible to construct a Gröbner basis from equations (12) and (13) and solve for the unknowns. However, Gröbner basis-based methods tend to suffer from considerable numerical instabilities for problems of high degree when implemented numerically.

Solving the equations numerically, for example using HOMPACK, generally results in multiple solution triples. However, not all the solutions are real, and real solutions are sought. Moreover, solutions are sought that satisfy:

$$F_1 > 0$$

$$F_2 > 0$$

as only those solutions will lead to real $f_1$ and $f_2$. Once $f_1$, $f_2$ and $\kappa$ are found, any one of several methods or algorithms may be used to compute R. For example, any one of several feature-based techniques may be used to compute R.

Heuristics to Remove Uninteresting Solutions

For solutions that are produced by solving the equations numerically, since real-world focal lengths tend to be within a range (for instance, it may be safely assumed that common focal lengths are within the range of 5 mm to 1000 mm), in one embodiment, solutions that have unrealistic focal lengths (focal lengths outside a given range) may be removed. In one embodiment, the lens distortion parameter may be assumed to be within a range, for example −1 to 1, and solutions with lens distortion parameters outside of the assumed range may be removed.

Pre-Normalization

To make the equations well behaved, in one embodiment, the coordinates of points in the three point-correspondences may be pre-normalized by estimates of the focal lengths. The estimates may, for example, be obtained based on Exchangeable Image File Format (EXIF) data in the images, from image data in some other format than EXIF, or from image dimensions. For instance, according to EXIF data, a rough estimate for the focal length may be calculated. If EXIF (or other) data are not available, f may be estimated to be half of the sum of image width and height, which approximately corresponds to 30 mm focal length on full-frame digital SLRs. Similar estimations may be applied for digital SLRs of different form factors. The form factor of digital SLR cameras may be defined as the relative physical size of an imaging sensor with respect to that of a 35 mm film camera. For instance, for a camera with form factor 1.6, the formula ((width+height)/2*1.6) may be used to estimate an effective equivalent to 30 mm focal length on a full-frame digital SLR. Assuming $f_o$ as a pre-normalization constant, $(u_i \leftarrow -u_i/f_0)$ may be applied to pre-normalize. At the end of calculation, $(f_1 \leftarrow -f_1 * f_0)$ may be applied.

Core Estimator Based on Nonlinear Optimization

Embodiments of a core estimator based on nonlinear optimization are described, which may be referred to herein as a nonlinear optimization core estimator. In addition to suffering from numerical instability issues, the previously described methods such as those based on a Gröbner basis make no use of prior knowledge in a given problem. For instance, in the absence of any prior knowledge, it is still known that the two focal lengths are real and positive and that the distortion coefficient is a small real number around 0. In practice, known ranges for the focal lengths and distortion coefficients can often be obtained, for example from EXIF data in the images. A more efficient core estimator may be obtained by taking advantage of the prior knowledge.

The root-seeking problem is cast into an optimization framework. In particular, the following objective function is minimized:

$$(\theta_{X_1,Y_1} - \theta_{X_2,Y_2})^2 + (\theta_{Y_1,Z_1} - \theta_{Y_2,Z_2})^2 + (\theta_{Z_1,X_1} - \theta_{Z_2,X_2})^2 \quad (15)$$

It is obvious that the roots to equations (12) and (13) are the minima. Note that cost (15) is not an arbitrary algebraic quantity, but is geometrically meaningful. In fact, it measures the cumulative difference between corresponding angles. Since cost (15) is in a form of nonlinear least squares, a method, for example a Levenberg-Marquardt algorithm, with analytical derivatives may be used to perform the optimization. Other methods may be used as well. The initial values for the unknowns may be obtained as follows. Prior knowledge for $\kappa$ may be used as the initial value $\kappa^0$) since the distortion coefficient usually does not vary significantly. In the absence of prior knowledge, $\kappa^0 = 0$ may be used. Equations (12) may then be solved, assuming $\kappa$ is known, to obtain initial values for ($f_1$, $f_2$). In particular, given $\kappa = \kappa^0$, equations (12) may be reduced to:

$$\begin{cases} (\langle \tilde{x}_1, \tilde{y}_1 \rangle + \tilde{F}_1)^2 (\|\tilde{x}_2\|^2 + \tilde{F}_2)(\|\tilde{y}_2\|^2 + \tilde{F}_2) = \\ (\langle \tilde{x}_2, \tilde{y}_2 \rangle + \tilde{F}_2)^2 (\|\tilde{x}_1\|^2 + \tilde{F}_1)(\|\tilde{y}_1\|^2 + \tilde{F}_1), \\ (\langle \tilde{y}_1, \tilde{z}_1 \rangle + \tilde{F}_1)^2 (\|\tilde{y}_2\|^2 + \tilde{F}_2)(\|\tilde{z}_2\|^2 + \tilde{F}_2) = \\ (\langle \tilde{y}_2, \tilde{z}_2 \rangle + \tilde{F}_2)^2 (\|\tilde{y}_1\|^2 + \tilde{F}_1)(\|\tilde{z}_1\|^2 + \tilde{F}_1), \\ (\langle \tilde{z}_1, \tilde{x}_1 \rangle + \tilde{F}_1)^2 (\|\tilde{z}_2\|^2 + \tilde{F}_2)(\|\tilde{x}_2\|^2 + \tilde{F}_2) = \\ (\langle \tilde{z}_2, \tilde{x}_2 \rangle + \tilde{F}_2)^2 (\|\tilde{z}_1\|^2 + \tilde{F}_1)(\|\tilde{x}_1\|^2 + \tilde{F}_1) \end{cases} \quad (16)$$

where:

$$\tilde{x}_i = \frac{\bar{x}_i / f_i^P}{1 + \kappa^0 \|\bar{x}_i / f_i^P\|^2}, \tilde{y}_i = \frac{\bar{y}_i / f_i^P}{1 + \kappa^0 \|\bar{y}_i / f_i^P\|^2}, \tilde{z}_i = \frac{\bar{z}_i / f_i^P}{1 + \kappa^0 \|\bar{z}_i / f_i^P\|^2} \quad (17)$$

and $f_1^P$ and $f_2^P$ are given by the prior knowledge ($f_1^P = 0$ and $f_2^P = 0$ may be used in the absence of prior knowledge). $\tilde{F}_1$ and $\tilde{F}_2$ may be solved using any one of several techniques. Finally, the initial values for $f_1$ and $f_2$ may be given by:

$$f_i^0 = f_i^P \sqrt{\tilde{F}_i}, i = 1, 2. \quad (18)$$

Note that the Levenberg-Marquardt part is a fairly small problem (three unknowns and three squared terms) and may be implemented very efficiently.

Solving for the Rotation

Once the focal lengths and the distortion coefficient are known, the rotation may be computed. Using equation (5), $$\frac{X_1}{\|X_1\|}$$

may be computed as follows:

$$\frac{X_1}{\|X_1\|} = \frac{1}{\sqrt{\frac{1}{f_1^2}\|\bar{x}_1\|^2 + \left(1 + \frac{\kappa}{f_1^2}\|\bar{x}_1\|^2\right)^2}} \begin{bmatrix} \bar{x}_1 / f_1 \\ 1 + \frac{\kappa}{f_1^2}\|\bar{x}_1\|^2 \end{bmatrix} \quad (19)$$

Similarly, $$\frac{X_2}{\|X_2\|}, \frac{Y_1}{\|Y_1\|}, \frac{Y_2}{\|Y_2\|}, \frac{Z_1}{\|Z_1\|}, \text{ and } \frac{Z_2}{\|Z_2\|}$$

may be computed. Any of various mechanisms may then be invoked to obtain the rotation.

Robust Solutions and Bundle Adjustment

Core estimators such as the nonlinear optimization-based core estimator presented above are not intended to be used directly on point-correspondences because core estimators may be limited in the number of points they can handle and do not handle outliers or noise in point-correspondences. Embodiments of the core estimator may thus be used in a hypothesis testing framework or robust estimator, such as RANSAC, so that the robust estimator may handle outliers and noise.

It may be necessary or desirable to further refine the parameters obtained by the robust solutions for better results. This step is known as bundle adjustment. In general, there are two categories or types of bundle adjustments: pairwise and multi-image bundle adjustments. Multi-image bundle adjustment is described briefly. Pairwise bundle adjustment may be considered as a special case. In some embodiments, a multi-image bundle adjustment algorithm may be used to optimize the following geometric cost function:

$$\sum_{i=1}^{M} \sum_{j=1}^{N} w_{ij} \|\hat{x}_{ij}(\theta_j, \phi_j; R_i, f_i, k_i | c_i) - xi_j\|^2 \quad (20)$$

where M is the number of images and N is the number of chains of consistent point-correspondences. Consistent means that all the points are projections of the same point in space. This point is denoted as $X_j$ which is parameterized by spherical coordinates ($\theta_j, \phi_j$) with respect to a chosen reference frame, i.e.:

$$X_j = [\cos(\theta_j)\cos(\phi_j), \cos(\theta_j)\sin(\phi_j), \sin(\theta_j)]^T$$

where $x_{ij}$ is the measured projection of $X_j$ in the i-th image and $w_{ij}$ is the associated weight. $w_{ij} = 0$ if $X_j$ does not appear in the i-th image; otherwise, it is a positive number. $R_i$, $f_i$, $k_i$, and $c_i$ are the rotation, focal length, radial distortion coefficient and image center of the i-th image respectively. $\hat{x}_{ij}$ is the measurement equation given by:

$$\hat{x}_{ij}(\theta_j, \phi_j; R_i, f_i, k_i | c_i) = f_i \hat{k}_i(\pi(R_i X); k_i) + c_i \quad (21)$$

where:

$$\hat{k}_i(q; k_i) = q(1 + k_{i1}\|q\|^2 + k_{i2}\|q\|^4)$$

for any $q \in R^2$ where $k_i = [k_{i1}, k_{i2}]^T$. In one embodiment, a distortion model as described by Zhang (Z. Zhang. A flexible new technique for camera calibration. *IEEE Trans. on Pattern Analysis and Machine Intelligence*, 22(11):1330-1334, November 2000) may be used rather than the division model that was previously described because Zhang's distortion model has two parameters and better represents the distortion effects. Note, however, that embodiments are not limited to a particular distortion model. It is possible to go from the division model to Zhang's distortion model by noticing the following relationship in equation (2):

$$p = q(1 + \kappa\|p\|^2) = q(1 + \kappa\|q\|^2 + 2\kappa^2\|q\|^4 + O(\|q\|^6)) \quad (22)$$

The unknowns in equation (20) are $\theta_j$, $\phi_j$, j=1, ..., N, and $R_i$; $f_i$, $k_i$, i=1, ..., M. Observing that cost (20) is in a nonlinear least squares form, it may be optimized, for example by using Levenberg-Marquardt which can be implemented efficiently using sparse techniques. Other methods to optimize cost (20) may be used.

Implementations

Embodiments provide a core estimator that includes a correction for lens distortion and that may use a minimum number (three) of point-correspondences. Embodiments provide a core estimator for simultaneous estimation of a single radial distortion coefficient, a rotation and two focal lengths. Embodiments of the core estimator, for example an embodiment of a nonlinear optimization core estimator as described above, may be implemented in any of various image processing applications or systems that perform panoramic image stitching. As mentioned, embodiments of the core estimator may be implemented with or wrapped in a "robust estimator" or hypothesis testing framework that handles noise and errors in point-correspondences in the pairwise (two image) stage. An exemplary hypothesis testing framework or robust estimator that may be used is RANSAC.

Figure 10:
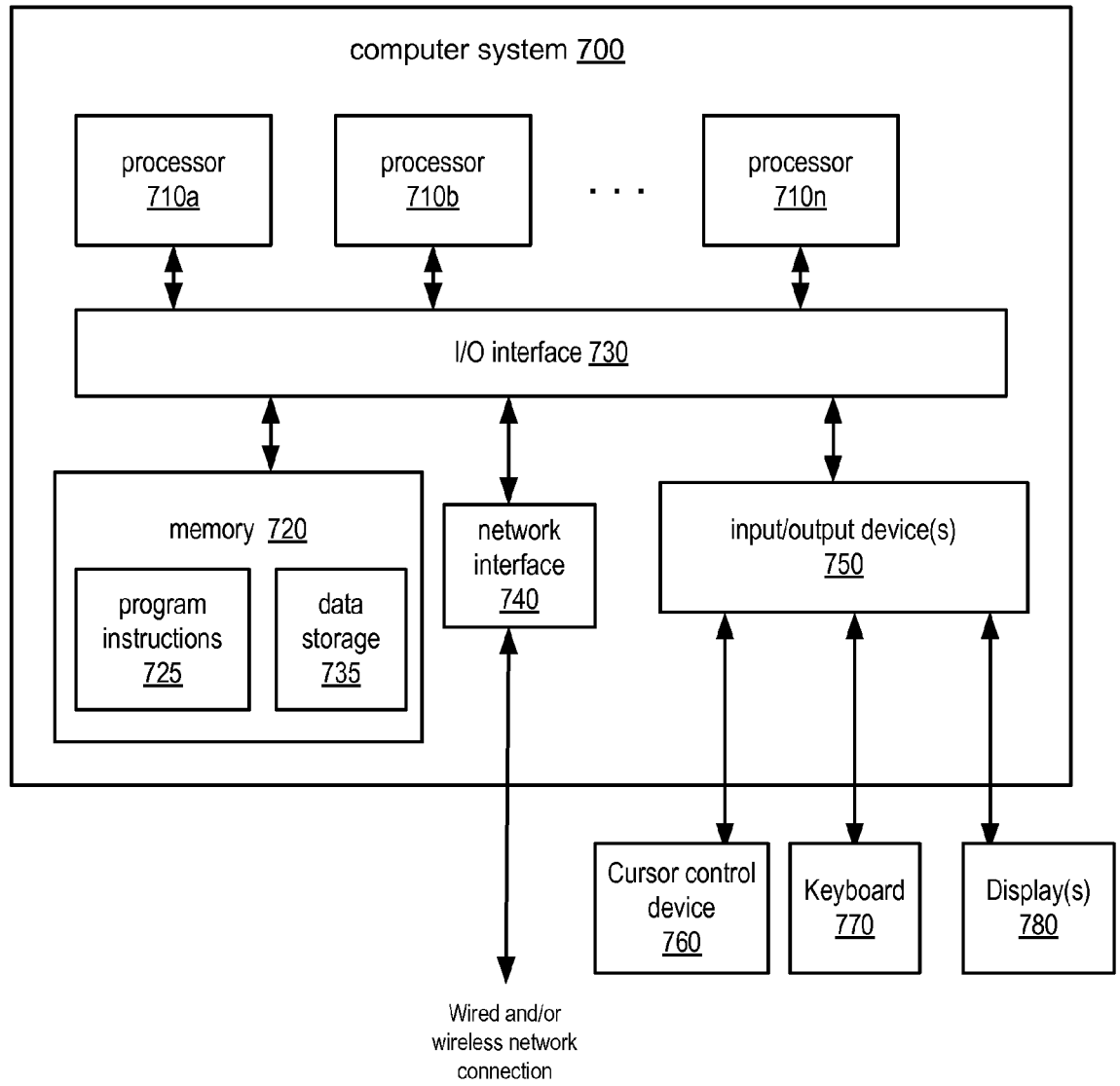
FIG. 10 illustrates an exemplary computer system that may be used in embodiments.

FIG. 1 illustrates an exemplary composite image generation system that includes an exemplary core estimator according to one embodiment. Composite image generation system 200 may be a computer program, application, system or component that may execute on a computer system or combination of two or more computer systems. An exemplary computer system on which composite image generation system 200 may be implemented is illustrated in FIG. 10. A set of two or more component images 100 may be input into the composite image generation system 200.

In one embodiment, pairwise stage 220 may implement a robust estimator 204. Robust estimator 204 may be implemented as a hypothesis testing framework such as RANSAC. In one embodiment, for each pair of overlapping images in component images 100, robust estimator 204 takes a large number of point-correspondences between the two images (e.g., using random selection) and attempts to find a best alignment model by iterating through small subsets of the point-correspondences. The robust estimator 204 starts with a small set of point-correspondences, finds an alignment model for the set, and verifies the alignment model against the entire set of point-correspondences. This is repeated for other small sets of point-correspondences (each set containing three point-correspondences). An alignment model is a mathematical model that defines the geometric relationship between two images and that may be applied to the image data to adjust one or both images into alignment as part of the process of merging component images into a composite or panoramic image. In embodiments, an alignment model is a combination of rotation, focal lengths, and radial distortion.

Core estimator 202, for example a nonlinear optimization core estimator as described above, may be used in finding alignment models corresponding to sets of point-correspondences. Core estimator 202 accepts three point-correspondences (the minimum) and estimates rotation, focal lengths, and radial distortion for the corresponding pair of images using three-point correspondence. Several embodiments of a core estimator 202 that may be used are described above. The robust estimator 204 determines, tracks, and records the best or most correct sets of point-correspondences that are estimated and output by core estimator 202. From a best or most correct set of point-correspondences, a best alignment model for the two images can be found. Thus, robust estimator 204 tries many sets of point-correspondences using core estimator 202 to estimate corresponding rotation, focal lengths, and radial distortion, finds a best or most correct three-point correspondence, and thus determines a best alignment model corresponding to the best or most correct three-point correspondence.

Once pairwise stage 220 has processed all of the component images 100, the determined geometric relationships 112 (e.g., alignment models) may be passed to multi-image stage 208, which may then generate the composite image 114 from the component images 100 using the information in geometric relationships 112.

Figure 2:
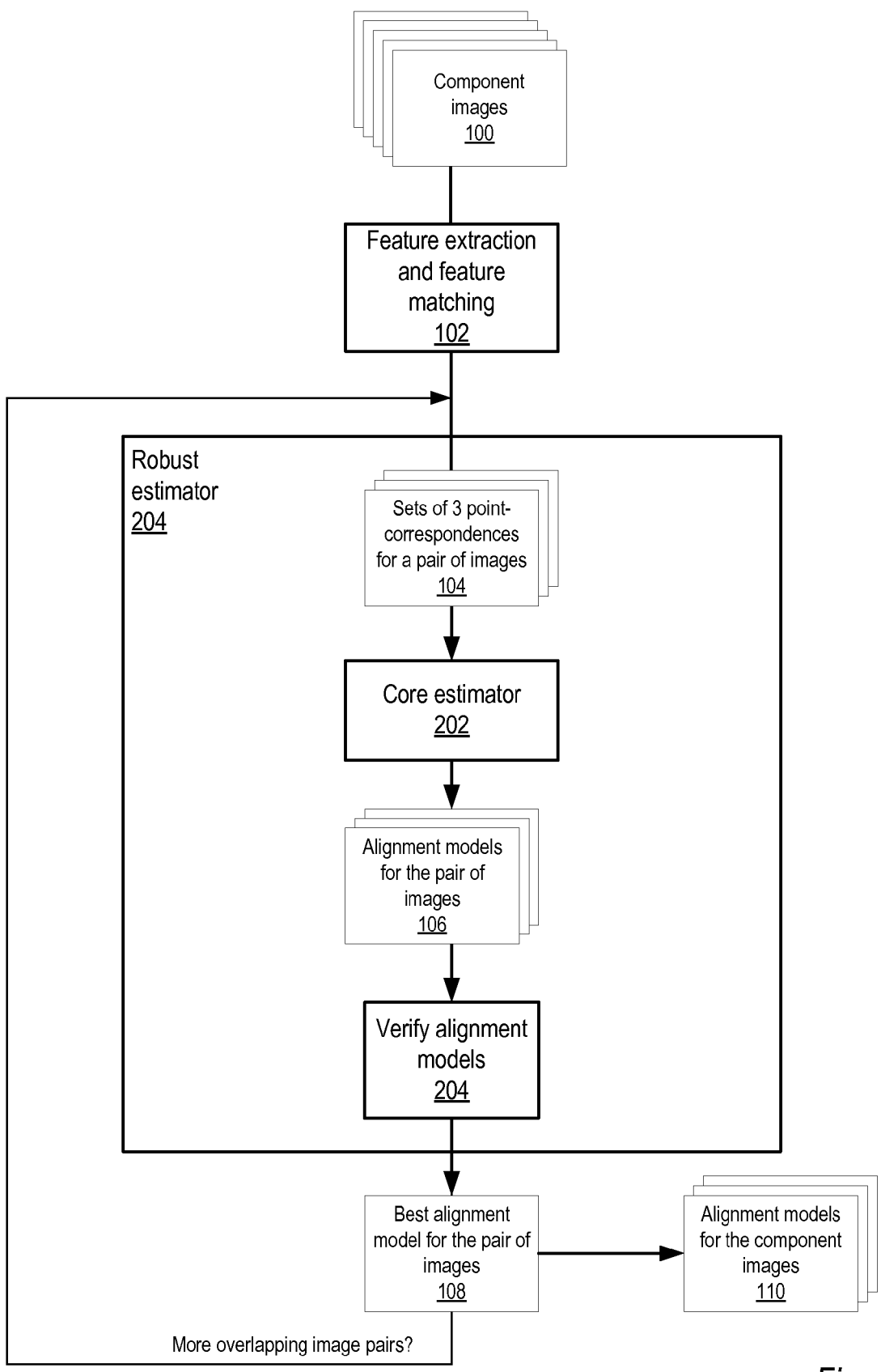
FIG. 2 illustrates an exemplary robust estimator and an exemplary core estimator in a pairwise stage of a composite image generation system according to one embodiment.

FIG. 2 illustrates an exemplary robust estimator and an exemplary core estimator in a pairwise stage of a composite image generation system according to one embodiment. A set of component images 100 may be input into a composite image generation system. Feature extraction and feature matching 102 may be performed to extract features and generate point-correspondences from the extracted features for pairs of images 100 that overlap. Robust estimator 204 may be implemented as a hypothesis testing framework such as RANSAC. In one embodiment, for each pair of overlapping images in component images 100, robust estimator 204 takes a large number of point-correspondences between the two images (e.g., using random selection or some other selection method) and attempts to find a best alignment model (rotation, focal lengths, and radial distortion) by iterating through small subsets of the point-correspondences. The robust estimator 204 starts with a set of three point-correspondences 104 for two images, finds an alignment model for the two images from the set 104 using core estimator 202, and verifies the alignment model against all point-correspondences for the two images. This is repeated for other small sets of point-correspondences 104 for the two images, each set containing three point-correspondences.

Core estimator 202 accepts a set of three point-correspondences 104 and estimates rotation, focal lengths, and radial distortion using three-point correspondence. Several embodiments of a core estimator 202 that may be used are described above. For example, in one embodiment, a nonlinear optimization core estimator may be used. The robust estimator 204 determines, tracks, and records the best or most correct sets of point-correspondences that are estimated and output by core estimator 202. From a most correct set of point-correspondences, a best alignment model for the two images can be found. The robust estimator may then move to a next pair of overlapping images 100 and repeat the process until all pairs of images are processed. Thus, robust estimator 204 tries many sets of three point-correspondences 104 for each pair of overlapping images 100 using core estimator 202, finds a most correct point correspondence for each pair of overlapping images, and thus a best alignment model for each pair of overlapping images.

Once all of the pairs of overlapping images in component images 100 have been processed, the alignment models 110 may be passed to a multi-image processing stage of the composite image generation system, which may generate a composite image from the component images 100 using at least the alignment models 110.

Figure 3:
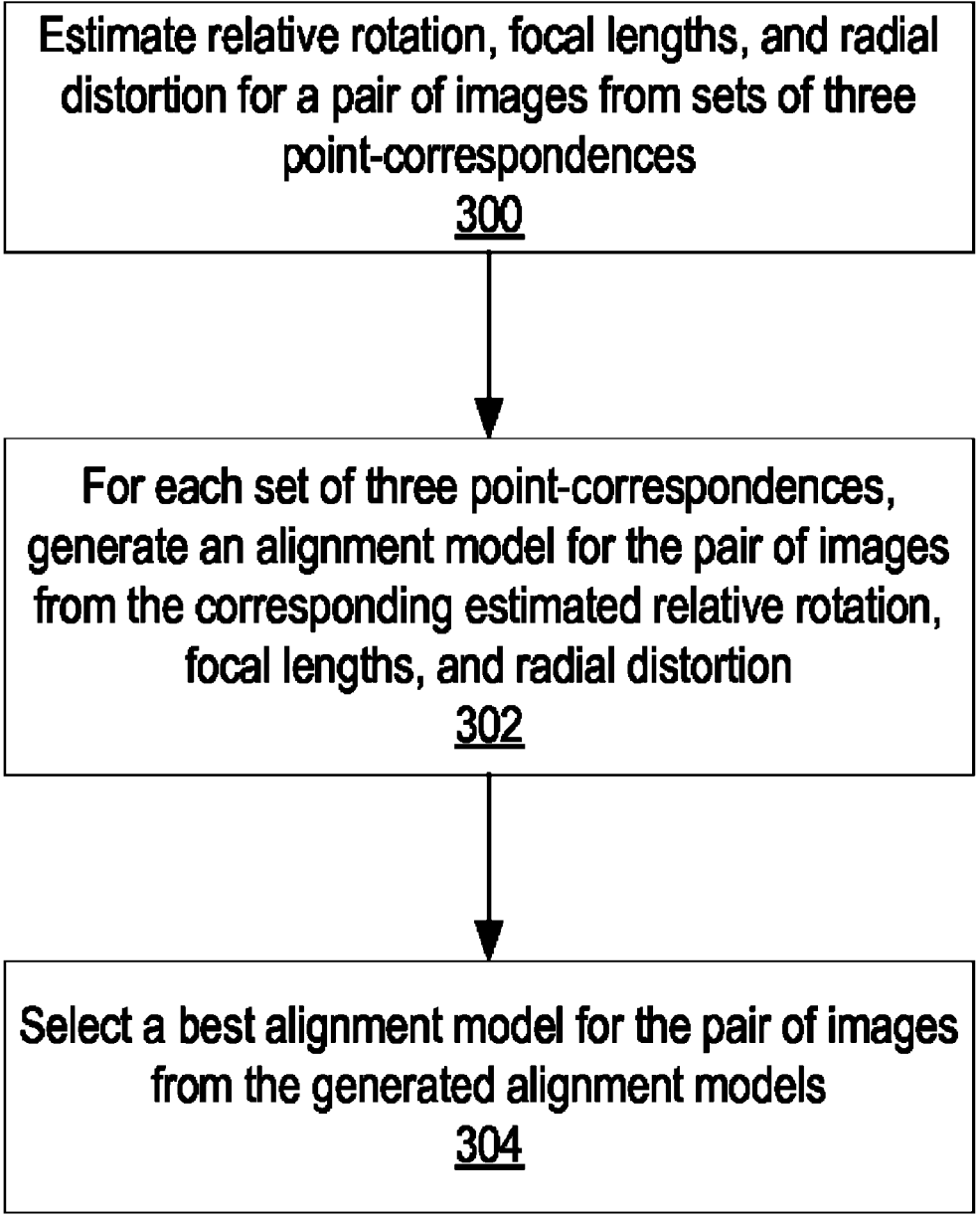
FIG. 3 is a flowchart of a method for estimating rotation, focal lengths, and lens distortion in panoramic image stitching according to one embodiment.

FIG. 3 is a flowchart of a method for estimating rotation, focal lengths, and lens distortion in panoramic image stitching according to one embodiment. As indicated at 300, relative rotation, focal lengths, and radial distortion may be estimated for a pair of images from sets of three point-correspondences. In embodiments, a core estimator as described herein, such as the nonlinear optimization core estimator, may be used to estimate relative rotation, focal lengths, and radial distortion for each set of three point-correspondences. In one embodiment, the core estimator may be "wrapped" in a robust estimator, for example a hypothesis testing framework. RANSAC is an exemplary hypothesis testing framework that may be used as a robust estimator in embodiments, but other hypothesis testing frameworks or robust estimators may be used. The robust estimator may feed the sets of three point-correspondences to the core estimator, which may output the estimated relative rotation, focal lengths, and radial distortion for each set to the robust estimator.

As indicated at 302, for each set of three point-correspondences, an alignment model for the pair of images may be generated from the corresponding estimated relative rotation, focal lengths, and radial distortion. In one embodiment, the robust estimator may generate the alignment models. A best alignment model for the pair of images may be determined from the generated alignment models, as indicated at 304.

The pair of images may, for example, be overlapping images from a plurality of component images taken of a panoramic scene. The robust estimator and core estimator may perform the method described above for each discrete pair of overlapping images in the plurality of component images in a pairwise stage of a composite image generation process. The output from the method or pairwise stage (geometric relationships among the images, including but not limited to the alignment models) may then be applied to the input component images in a multi-image state to stitch the plurality of component images into a panoramic image.

Figure 4:
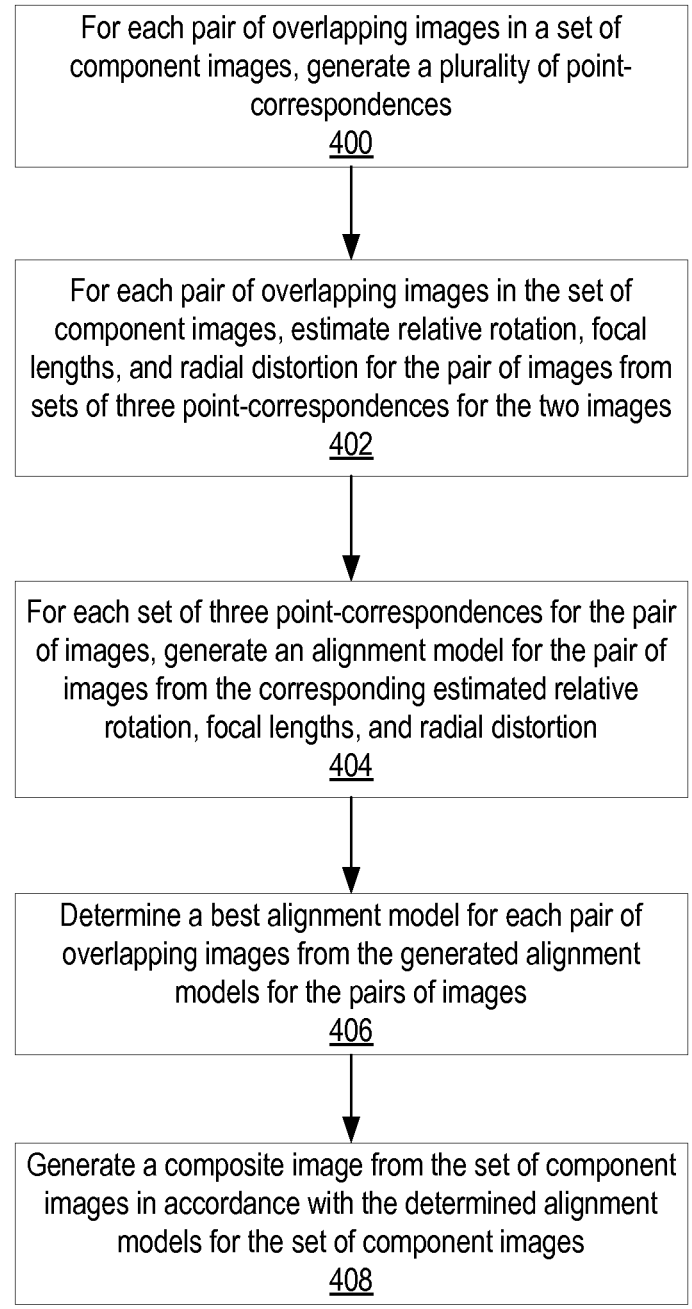
FIG. 4 is a flowchart of a method for composite image generation that uses a core estimator as described herein, according to one embodiment.

FIG. 4 is a flowchart of a method for composite image generation that uses a core estimator as described herein, according to one embodiment. As indicated at 400, for each pair of overlapping images in a set of component images, a plurality of point-correspondences may be generated, for example in a feature extraction and feature matching stage of a composite image generation process. As indicated at 402, for each pair of overlapping images in the set of component images, relative rotation, focal lengths, and radial distortion for the pair of images may be estimated from sets of three point-correspondences for the two images. In one embodiment, a robust estimator or hypothesis testing framework may select sets of three point-correspondences and feed the sets to an embodiment of the core estimator as described herein, such as a nonlinear optimization core estimator. The core estimator may estimate relative rotation, focal lengths, and radial distortion from each set of three point-correspondences.

As indicated at 404, for each set of three point-correspondences for the pair of overlapping images, an alignment model for the pair of images may be generated by the robust estimator from the corresponding relative rotation, focal lengths, and radial distortion as estimated and output by the core estimator. The robust estimator may thus generate sets of alignment models for each pair of overlapping images, using the core estimator to estimate relative rotation, focal lengths, and radial distortion for each set of three point-correspondences input to the core estimator. As indicated at 406, the robust estimator may determine a best alignment model for each pair of overlapping images from the generated alignment models for the overlapping pairs of images.

The robust estimator may output the best alignment models to a multi-image processing stage of the composite image generation process. A composite image may then be generated from the set of component images in accordance with the determined best alignment models for the set of component images, as indicated at 408.

While embodiments of the core estimator are generally described as working with sets of three point-correspondences, some embodiments of the core estimator may accept more than three point-correspondences for a pair of images and estimate relative rotation, focal lengths, and radial distortion for the pair of images according to the input more than three point-correspondences.

Figure 5:
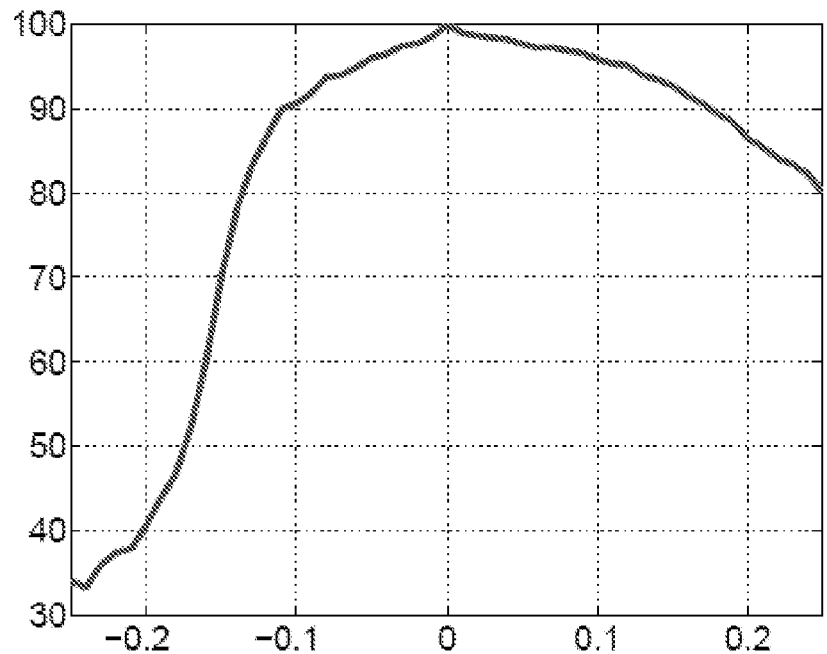
FIG. 5 is a plot that illustrates the convergence rate of an embodiment of the core estimator against the distortion coefficient on random geometry.

FIG. 5 is a plot that illustrates the convergence rate of an embodiment of the core estimator against the distortion coefficient on random geometry. An experiment was performed to test the convergence rate of the nonlinear optimization-based two-view core estimator. To that end, synthetic data was used that provided ground truth. For a given distortion coefficient, three noise-free point-correspondences were generated from random geometry according to equation (2). In particular, three points in space were randomly generated whose projections in one image were uniformly distributed in $[-0.5, 0.5] \times [-0.5, 0.5]$ and whose depths were uniformly distributed in $[1.3, 1.7]$; the axis of the rotation between two images was randomly sampled within a 30° cone around the y-axis. The two focal lengths are randomly sampled in $[0.5, 1.5]$ which corresponds to a range from 17 mm to 50 mm for 35 mm film cameras. These settings are typical for panoramas. The point-correspondences were fed into the core estimator and recorded if the algorithm found the best solution. For each distortion coefficient, the test was repeated 10,000 times and the whole process was repeated for 51 values of the distortion coefficient ranging uniformly from −0.25 to 0.25. The results are presented in FIG. 5. As can be seen in FIG. 5, the core estimator is able to converge correctly over 80% time for distortion from −0.14 to 0.25.

The performance of some embodiments of the core estimator may degrade for distortion coefficients lower than −0.14. Some embodiments of the core estimator may perform better for pincushion distortion (positive κ) than barrel distortion (negative κ). Note that it is not necessary to have a 100% convergence rate because the core estimator is generally intended for use in a hypothesis testing, or robust estimator, framework.

Figure 6A:
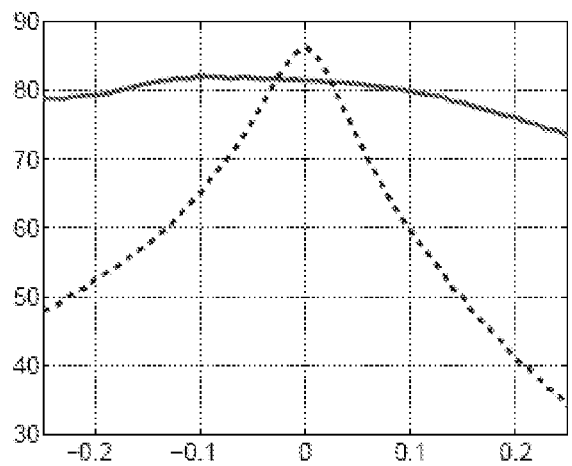
FIGS. 6A and 6B illustrates performance comparisons of embodiments of the core estimator and a conventional three point algorithm.
Figure 6B:
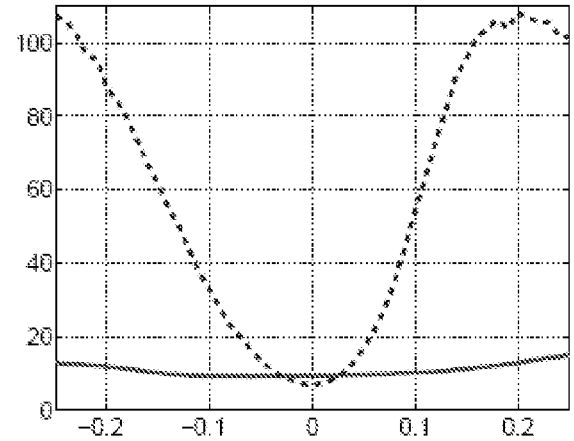

FIGS. 6A and 6B illustrates performance comparisons of embodiments of the core estimator and a conventional three point algorithm. An experiment was performed to check if an embodiment of the core estimator was able to retain more correct correspondences than a conventional algorithm that did not estimate lens distortion. The algorithm compared with is a conventional three-point algorithm. Again, synthetic data was used for the sake of ground truth. Both the embodiment of the core estimator and the conventional three point algorithm were wrapped in a RANSAC framework. For each distortion coefficient, 200 noisy point-correspondences were generated from random geometry, which is the same as in the first test. The noise added to point-correspondences was zero-mean Gaussian with standard deviation set to 0.1% of the image width. The maximum number of trials for RANSAC was set to 500 and the desired confidence was set to 0.995. For each distortion coefficient, the test was repeated 10,000 times. The results are presented in FIGS. 6A and 6B, where the solid lines are the results of the embodiment of the core estimator and the dashed lines are the results of the conventional three point algorithm. FIG. 6A shows the percentage of best or most correct correspondences that the core estimator (solid line) and the conventional three point algorithm (dashed line) may retain for distortion ranging from −0.25 to 0.25. The core estimator averages at above 75% while that of the conventional three point algorithm is considerably lower for most distortion coefficients. FIG. 6B shows the number of trials needed to obtain a RANSAC confidence of 0.995. The core estimator (solid line) needs only about 15 trials on average while the conventional three point algorithm (dashed line) needs many more trials on average.

From the above, the tested embodiment of the core estimator outperforms the conventional three point algorithm. In particular, the core estimator is able to retain over 75% best or most correct point-correspondences in about 15 trials on average. An important implication of these two plots is that, although the core estimator may be more expensive than a conventional three-point algorithm, the entire RANSAC process with the core estimator on images with lens distortion may be significantly faster because of fewer trials and a higher inlier ratio.

Figure 7A:
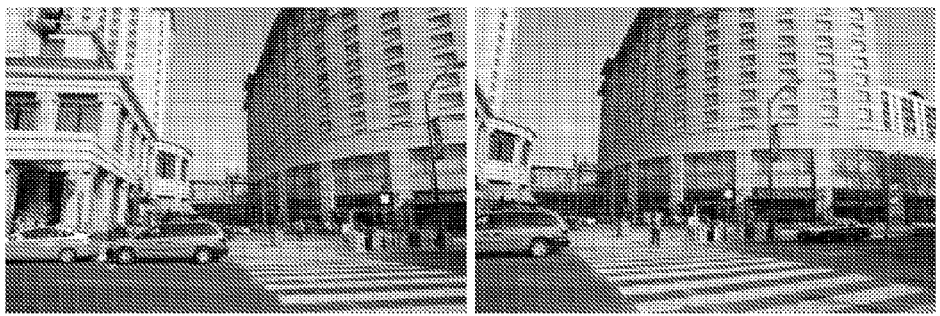
FIGS. 7A through 7C illustrate a comparison on real images without lens distortion estimation and with radial distortion estimation according to one embodiment.
Figure 7B:
Figure 7C:

FIGS. 7A through 7C illustrate a comparison on real images without lens distortion estimation and with radial distortion estimation according to one embodiment. The two images in FIG. 7A are input images. SIFT features may be used. SIFT (Scale-invariant feature transform) is an algorithm in computer vision to detect and describe local features in images. The image in FIG. 7B is the result obtained without lens distortion estimation. The composition mode is cylindrical. The two images from FIG. 7A are alpha-blended with equal weights in the overlapping regions. There are visible misalignments, for example in the crosswalk region. The image in FIG. 7C is the result obtained with lens distortion estimation using an embodiment of the core estimator as described herein. Again, the two images from FIG. 7A are alpha-blended with equal weights in the overlapping regions. There is no visible misalignment in the image in FIG. 7C.

Figures 8A, 8B:
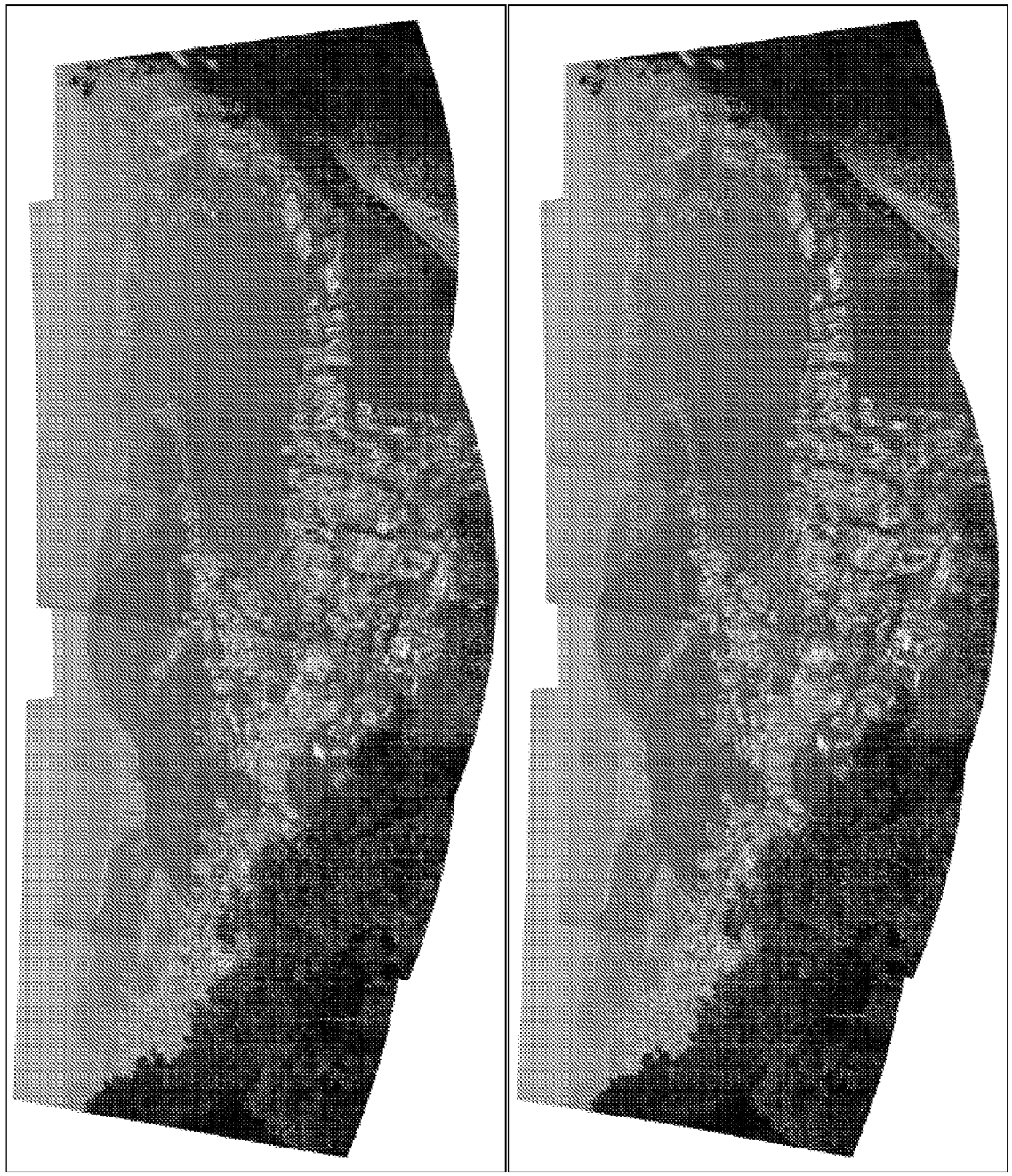
FIGS. 8A and 8B illustrate the application of multi-image bundle adjustment according to one embodiment.

FIGS. 8A and 8B illustrate the application of multi-image bundle adjustment according to one embodiment. The composite image in FIG. 8A was generated with pairwise bundle adjustment but without multi-image bundle adjustment, while the composite image in FIG. 8B was generated with both pairwise bundle adjustment and multi-image bundle adjustment. Lens distortion is estimated in both cases. Images are simply stacked one onto another without alpha-blending. The alignment is observably better in the composite image of FIG. 8B to which multi-image bundle adjustment was applied.

Figures 9A, 9B, 9C:
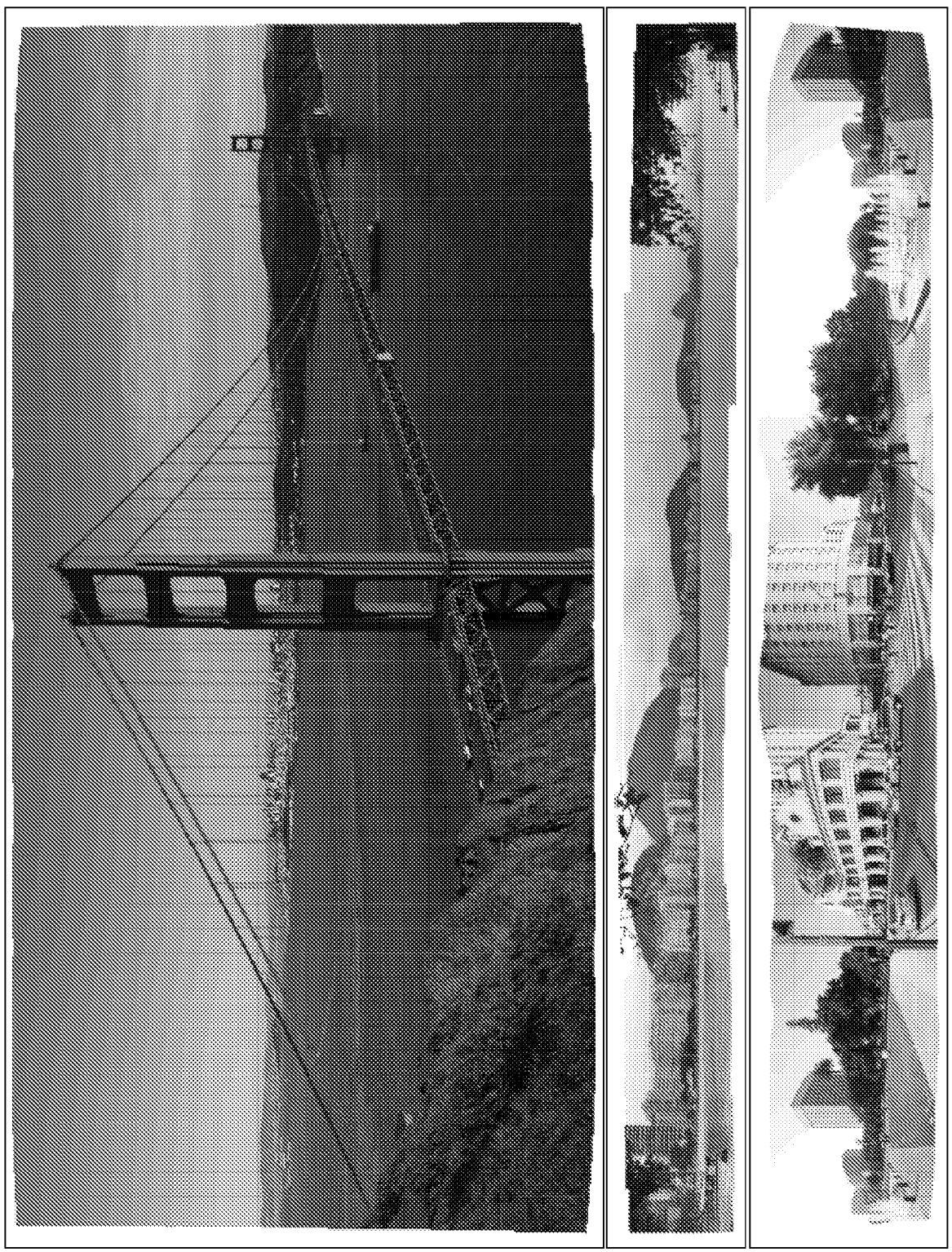
FIGS. 9A through 9C illustrate real-image examples of multi-image stitching with lens distortion accounted for using a core estimator according to one embodiment.

FIGS. 9A through 9C illustrate real-image examples of multi-image stitching with lens distortion accounted for using a core estimator according to one embodiment. FIG. 9A shows a composite image of the Golden Gate bridge stitched from six input images. The image shown in FIG. 9B is a stitch of the Copacabana beach from 35 input images. The image shown in FIG. 9C is a full 360° panorama stitched from 23 input images. Features were extracted using SIFT, and blending was performed. Note that various methods for extracting features and/or for blending may be used in embodiments.

Exemplary System

Various components of embodiments of a method and apparatus for estimating rotation, focal lengths, and lens distortion in panoramic image stitching may be executed on one or more computer systems, which may interact with various other devices. One such computer system is illustrated by FIG. 10. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a method and apparatus for estimating rotation, focal lengths, and lens distortion in panoramic image stitching, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 10, memory 720 may include program instructions 725, configured to implement embodiments of a method and apparatus for estimating rotation, focal lengths, and lens distortion in panoramic image stitching as described herein, and data storage 735, comprising various data accessible by program instructions 725. In one embodiment, program instructions 725 may include software elements of a method and apparatus for estimating rotation, focal lengths, and lens distortion in panoramic image stitching as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of a method and apparatus for estimating rotation, focal lengths, and lens distortion in panoramic image stitching as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
performing, by one or more computing devices:
   generating, for a pair of images, a plurality of estimates of relative rotation, focal lengths, and radial distortion according to a plurality of sets of three point-correspondences for the pair of images, where each point-correspondence represents a different feature point that occurs in both of the images;
   generating a plurality of alignment models for the pair of image according to the plurality of estimates of relative rotation, focal lengths, and radial distortion; and
   determining which of the plurality of alignment models are to be used for processing the pair of images.

2. The method as recited in claim 1, wherein each alignment model is a mathematical model that defines a geometric relationship between the two images.

3. The method as recited in claim 1, wherein said determining including determining a best alignment model for the pair of images by verifying each of the plurality of alignment models against a plurality point-correspondences for the pair of images.

4. The method as recited in claim 1, wherein generating estimates of relative rotation, focal lengths, and radial distortion according to a set of three point correspondences comprises:
   composing a set of parametric equations from the three point-correspondences;
   solving the set of parametric equations to generate the estimates of focal lengths and radial distortion; and
   computing the estimate of relative rotation from the three point-correspondences and the estimates of focal lengths and radial distortion.

5. The method as recited in claim 1, further comprising stitching the pair of images in accordance with the determined alignment model to form a composite image from the pair of images.

6. The method as recited in claim 1, further comprising:
  performing said generating a plurality of estimates of relative rotation, focal lengths, and radial distortion, said generating a plurality of alignment models, and said determining for at least two pairs of images in a plurality of component images; and
  generating a panoramic image from the plurality of component images according to the determined alignment models.

7. The method as recited in claim 1, wherein said generating a plurality of estimates of relative rotation, focal lengths, and radial distortion is performed by a core estimator implemented with a robust estimator, wherein the robust estimator performs said generating a plurality of alignment models and said determining which of the plurality of alignment models are to be used for processing the pair of images.

8. The method as recited in claim 1, wherein the pair of images are overlapping images from a plurality of component images taken of a panoramic scene.

9. A system, comprising:
  at least one processor; and
  a memory comprising program instructions, wherein the program instructions are executable by the at least one processor to:
    generate, for a pair of images, a plurality of estimates of relative rotation, focal lengths, and radial distortion according to a plurality of sets of three point-correspondences for the pair of images, where each point-correspondence represents a different feature point that occurs in both of the images;
    generate a plurality of alignment models for the pair of image according to the plurality of estimates of relative rotation, focal lengths, and radial distortion; and
    determine which of the plurality of alignment models are to be used to form a composite image from the pair of images.

10. The system as recited in claim 9, wherein each alignment model is a mathematical model that defines a geometric relationship between the two images.

11. The system as recited in claim 9, wherein the determination includes a determination of a best alignment model for the pair of images, the program instructions are executable by the at least one processor to verify each of the plurality of alignment models against a plurality of point-correspondences for the pair of images.

12. The system as recited in claim 9, wherein, to generate estimates of relative rotation, focal lengths, and radial distortion according to a set of three point correspondences, the program instructions are executable by the at least one processor to:
  compose a set of parametric equations from the three point-correspondences;
  solve the set of parametric equations to generate the estimates of focal lengths and radial distortion; and
  compute the estimate of relative rotation from the three point-correspondences and the estimates of focal lengths and radial distortion.

13. The system as recited in claim 9, wherein the program instructions are executable by the at least one processor to stitch the pair of images in accordance with the determined alignment model to form the composite image from the pair of images.

14. The system as recited in claim 9, wherein the program instructions are executable by the at least one processor to:
  perform said generating a plurality of estimates of relative rotation, focal lengths, and radial distortion, said generating a plurality of alignment models, and said determining a best alignment model for at least two different pairs of images in a plurality of component images; and
  generate a panoramic image from the plurality of component images according to the determined alignment models.

15. A computer-readable memory medium storing program instructions, wherein the program instructions are computer-executable to implement:
  generating, for a pair of images, a plurality of estimates of relative rotation, focal lengths, and radial distortion according to a plurality of sets of three point correspondences for the pair of images, where each point-correspondence represents a different feature point that occurs in both of the images;
  generating a plurality of alignment models for the pair of image according to the plurality of estimates of relative rotation, focal lengths, and radial distortion; and
  determining, from the plurality of alignment models for the pair of images, a best alignment model for the pair of images.

16. The computer-readable memory medium as recited in claim 15, wherein each alignment model is a mathematical model that defines a geometric relationship between the two images.

17. The computer-readable memory medium as recited in claim 15, wherein, in said determining a best alignment model for the pair of images, the program instructions are computer-executable to implement verifying each of the plurality of alignment models against a plurality of point-correspondences for the pair of images.

18. The computer-readable memory medium as recited in claim 15, wherein, in generating estimates of relative rotation, focal lengths, and radial distortion according to a set of three point-correspondences, the program instructions are computer-executable to implement:
  composing a set of parametric equations from the three point-correspondences;
  solving the set of parametric equations to generate the estimates of focal lengths and radial distortion; and
  computing the estimate of relative rotation from the three point-correspondences and the estimates of focal lengths and radial distortion.

19. The computer-readable memory medium as recited in claim 15, wherein the program instructions are computer-executable to implement stitching the pair of images in accordance with the best alignment model to form a composite image from the pair of images.

20. The computer-readable memory medium as recited in claim 15, wherein the program instructions are computer-executable to implement:
  performing said generating a plurality of estimates of relative rotation, focal lengths, and radial distortion, said generating a plurality of alignment models, and said determining a best alignment model for at least two different pairs of images in a plurality of component images; and
  generating a panoramic image from the plurality of component images according to the determined best alignment models.

* * * * *

UNITED STATES PATENT AND TRADEMARK OFFICE
CERTIFICATE OF CORRECTION

Page 1 of 1

PATENT NO. : 8,447,140 B1
APPLICATION NO. : 13/411255
DATED : May 21, 2013
INVENTOR(S) : Hailin Jin It is certified that error appears in the above-identified patent and that said Letters Patent is hereby corrected as shown below:

In the Claims

Column 20, Line 41, Claim 1, before "according to the...", delete "image" and insert -- images --, therefor.

Column 20, Line 51, Claim 3, insert -- of -- between "...a plurality" and "point-correspondence...", therefor.

Column 20, Line 55, Claim 4, insert -- - -- between "point" and "correspondence", therefor.

Column 21, Line 48, Claim 12, insert -- - -- between "point" and "correspondence", therefor.

Column 22, Line 14, Claim 15, insert -- - -- between "point" and "correspondence", therefor.

Column 22, Line 19, Claim 15, before "according to the...", delete "image" and insert -- images --, therefor.

Signed and Sealed this
Twenty-second Day of October, 2013

Teresa Stanek Rea
*Deputy Director of the United States Patent and Trademark Office*